United States Patent
Chang

(10) Patent No.: US 9,128,551 B2
(45) Date of Patent: Sep. 8, 2015

(54) TOUCH DISPLAY METHOD USING VIRTUAL KEYBOARD BEFORE LOADING OPERATING SYSTEM AND ELECTRONIC APPARATUS THEREOF

(71) Applicant: Getac Technology Corporation, Hsinchu (TW)

(72) Inventor: Chin-Jung Chang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 133 days.

(21) Appl. No.: 13/840,027

(22) Filed: Mar. 15, 2013

(65) Prior Publication Data
US 2014/0085228 A1    Mar. 27, 2014

(30) Foreign Application Priority Data
Sep. 25, 2012 (CN) .......................... 2012 1 0358995

(51) Int. Cl.
*G06F 3/041* (2006.01)
(52) U.S. Cl.
CPC ..................................... *G06F 3/041* (2013.01)
(58) Field of Classification Search
CPC ................................................ G06F 3/041
USPC ........................................................ 345/173
See application file for complete search history.

(56) References Cited

U.S. PATENT DOCUMENTS

| | | | |
|---|---|---|---|
| 4,725,694 A | 2/1988 | Auer et al. | |
| 6,094,197 A | 7/2000 | Buxton et al. | |
| 6,784,873 B1 | 8/2004 | Boesen et al. | |
| 8,326,358 B2 * | 12/2012 | Runstedler et al. | 455/556.2 |
| 2006/0197675 A1 * | 9/2006 | Liu | 340/825.69 |
| 2007/0239921 A1 * | 10/2007 | Toorians et al. | 710/306 |
| 2007/0257892 A1 * | 11/2007 | Hu et al. | 345/173 |
| 2010/0275003 A1 * | 10/2010 | Hsu et al. | 713/2 |
| 2010/0275004 A1 | 10/2010 | Hsu et al. | |
| 2011/0078786 A1 | 3/2011 | Kwong et al. | |
| 2011/0131400 A1 * | 6/2011 | Chiu et al. | 713/2 |
| 2013/0080891 A1 | 3/2013 | Byun | |
| 2013/0198502 A1 | 8/2013 | Rothman et al. | |
| 2014/0085224 A1 | 3/2014 | Chang | |
| 2014/0104229 A1 | 4/2014 | Chang | |

* cited by examiner

*Primary Examiner* — Kwang-Su Yang

(57) ABSTRACT

A touch display method is configured for an electronic apparatus including a touch display module and an embedded controller. The touch display module includes a touch display device and a touch input controller. The method includes following steps: loading a BIOS to perform an initialization operation when the electronic apparatus has not loaded an operating system; defining a virtual input area in the touch display device; and further displaying an input interface on the virtual input area. Generate a touch event when the touch display device is touched and translate the touch event into a coordinate by the touch input controller. If the coordinate is in the input interface, the touch input controller outputs a function signal to the embedded controller through the hardware interface. The embedded controller translates the function signal into a scan code for the electronic apparatus to execute operations corresponding to the scan code.

18 Claims, 5 Drawing Sheets

TOUCH DISPLAY METHOD USING VIRTUAL KEYBOARD BEFORE LOADING OPERATING SYSTEM AND ELECTRONIC APPARATUS THEREOF

BACKGROUND OF THE INVENTION

1. Field of the Invention

The invention relates generally to an electronic apparatus, and more particularly to an electronic apparatus capable of providing an input function during an initialization stage and a touch display method thereof.

2. Description of Related Art

In today's society, the touch screen has become one of the most commonly technologies in the daily lives, and the touch screen can be found in an electronic device such as mobile phone, tablet computer, automatic teller machine (ATM), and the personal digital assistant (PDA). Because the touch screen can provide people with an operating experience more convenient than the operating experience of the traditional physical keys, the current trend is towards fewer physical keys on the electronic device. However, even though the touch screen provides people with a high degree of convenience, people may be inconvenienced by insufficient physical keys when operating the electronic device sometimes.

For example, when the user needs to input commands into the electronic device during the initialization and the driver of the touch screen has not been loaded (e.g., selecting a boot mode), the electronic device itself would not have a sufficient amount of physical keys for the user. Accordingly, the user can not input some required commands and feels inconvenienced in the initialization process.

SUMMARY OF THE INVENTION

The invention provides an electronic apparatus and a touch display method thereof, capable of providing an input function for an user when the electronic apparatus executes an initialization and the driver program of the touch screen has not been loaded by the operating system.

The invention provides an electronic apparatus including a processor, a touch display module, and an embedded controller. The processor is configured to execute an operating system and loading a basic input/output system (BIOS) to execute an initialization program. The touch display module includes a touch display device and a touch input controller. The touch display device has a virtual input area, wherein the virtual input area displays an input interface. The touch display device generates a touch event when the touch display device is touched. The touch input controller is coupled to the touch display device. The touch input controller receives the touch event and translates the touch event into a coordinate. The embedded controller (EC) is coupled to the touch input controller through a hardware interface. When the electronic apparatus has loaded the initialization program and the electronic apparatus has not loaded the operating system, the virtual input area displays an input interface. When the electronic apparatus has loaded the initialization program and the electronic apparatus has not loaded the operating system, and the coordinate is in the input interface, the touch input controller outputs a function signal to the embedded controller through the hardware interface, and the embedded controller translates the function signal into a scan code, and the electronic apparatus executes operations corresponding to the scan code.

In an embodiment of the invention, after the electronic apparatus loads the operating system, the touch display module is defined as a touch screen.

In an embodiment of the invention, the electronic apparatus loads the initialization program to perform an initialization. After the electronic apparatus completes the initialization, the processor executes and loads the operating system.

In an embodiment of the invention, the input interface includes a plurality of functional key icons, and each of the functional key icons corresponds to different function signals and scan codes.

In an embodiment of the invention, when the coordinate is in a touched functional key icon of the plurality of functional key icons, the touch input controller outputs a corresponding function signal of the touched functional-key icon to an embedded controller.

In an embodiment of the invention, when the coordinate is in a touched functional key icon of the plurality of functional key icons, the embedded controller translates the corresponding function signal of the touched functional-key icon into the corresponding scan code and transmits the corresponding scan code to the processor.

In an embodiment of the invention, when the coordinate is not in the input interface, the touch input controller transmits the coordinate to the processor.

In an embodiment of the invention, the processor executes a functional-key function according to the scan code.

From another aspect, the invention provides a touch display method configured for an electronic apparatus. The electronic device includes a touch display module and an embedded controller. The touch display module includes a touch display device and a touch input controller. The touch display method includes the following steps: firstly, loading a basic input/output system (BIOS) to perform an initialization operation when the electronic apparatus has not loaded an operating system; defining a virtual input area in the touch display device; and further displaying an input interface on the virtual input area; generating a touch event when the touch display device is touched and translating the touch event into a coordinate; outputting a function signal to the embedded controller through a hardware interface by the touch input controller if the coordinate is in the input interface; translating the function signal into a scan code by the embedded controller for the electronic device to execute operations corresponding to the scan code.

In an embodiment of the invention, the method further includes loading the operating system of the electronic apparatus and defining the touch display module as a touch screen.

In an embodiment of the invention, steps of performing an initialization operation of an electronic apparatus include loading an initialization program by controlling the electronic apparatus to perform the initialization operation.

In an embodiment of the invention, the input interface includes a plurality of functional key icons, and each of the functional key icons corresponds to different function signals and scan codes.

In an embodiment of the invention, when the coordinate is in a touched functional key icon of the plurality of functional key icons, the touch input controller outputs a corresponding function signal of a touched functional-key icon to an embedded controller.

In an embodiment of the invention, when the coordinate is in a touched functional key icon of the plurality of functional key icons, the embedded controller translates a corresponding function signal of the touched functional-key icon into a corresponding scan code and transmits the corresponding scan code to the processor.

In an embodiment of the invention, the hardware interface is a general purpose input/output (GPIO) interface.

In an embodiment of the invention, when the coordinate is not in the input interface, outputting the coordinate, the touch input controller transmits the coordinate to an electronic apparatus.

In an embodiment of the invention, steps of performing an operation according to a scan code include executing a functional-key function according to the scan code.

In summary, by using the electronic apparatus and the touch display method thereof provided in the embodiments of the invention, the user can still input in the electronic apparatus through the input interface when the electronic apparatus is initializing and has not loaded the operating system. Accordingly, when the user operates the electronic apparatus, the efficiency and flexibility are enhanced.

In order to make the aforementioned features and advantages of the invention more comprehensible, embodiments accompanying figures are described in details below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
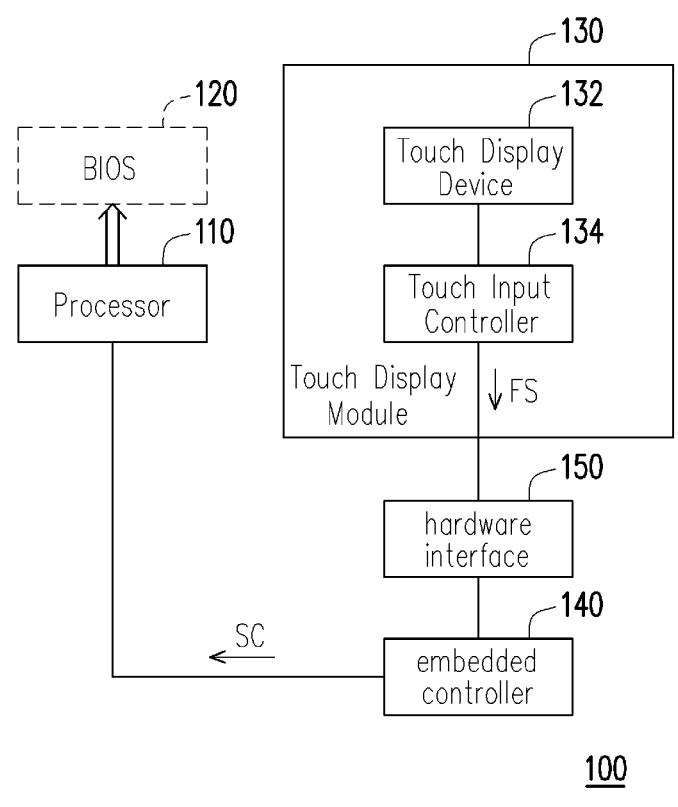
FIG. 1 is a functional block diagram of an electronic apparatus according to an embodiment of the invention.

FIG. 1 is a functional block diagram of an electronic apparatus according to an embodiment of the invention. With reference to FIG. 1, in the present embodiment, an electronic apparatus 100 includes a processor 110 and a touch display module 130. The processor 110 executes an operating system and loads a basic input/output system (BIOS) 120 to execute an initialization program. The operating system may be Windows, Linux, or Macintosh. The processor 110 may be a central processing unit (CPU). Moreover, in some embodiments, the processor 110 may include the functions of a north bridge chip and a south bridge chip, or a hardware component such as a micro controller unit (MCU), a processing chip, or a computer system, or a software component capable of signal processing functions (e.g., a signal processing application program). Moreover, the processor 110 may also be a combination of hardware and software components, although the possible implementations in the invention are not limited thereto.

The BIOS 120 may be a program code stored in a memory (not drawn), and the processor 110 may access the program code of the BIOS 120 in the memory in order to execute the initialization program. For example, when the electronic apparatus 100 is being initialized, the processor 110 (e.g. the CPU) may execute the program code of the BIOS 120. In addition, the BIOS 120 may include one of hardware, software, or firmware, or a combination thereof, although the invention is not limited thereto.

The initialization program may initialize components such as chipsets and memory subsystems, although the invention is not limited thereto. On the other hand, the processor 110 may perform diagnostics on hardware components such as keyboard, hard drive, and input/output ports in order to ensure these hardware components can be initialized and operate normally. The touch display module 130 includes a touch display device 132 and a touch input controller 134. The touch display device 132 may be a capacitive, resistive, or wave-based implemented touch screen, although the invention is not limited thereto.

The embedded controller 140 is coupled to the touch input controller 134 via a hardware interface 150. The hardware interface 150 is, for example, a general purpose input/output (GPIO) interface, but the embodiments of the invention are not limited thereto.

In order to enhance flexibility and freedom for operating the electronic apparatus 100, a virtual input area of the touch display device 132 can be used to implement a virtual input function such as virtual keyboard function, so that the user can perform more diverse input operations. Therefore, when the functions provided by the physical buttons of the electronic apparatus 100 cannot fulfill the needs of the user, the user can input by the virtual input function (e.g., the virtual keyboard).

In one embodiment, when the processor 110 in the electronic apparatus 100 (e.g. a rugged tablet computer) loads the BIOS 120 and executes the initialization program, the user may need to carry out some settings. Therefore, the processor 110 can perform the corresponding initialization operations according to user's settings when the processor 110 executes the program code of the BIOS 120. However, during the initialization process, since the operating system of the electronic apparatus 100 has not loaded the driver of the touch display module 130, the user cannot input operations into the electronic apparatus 100 through the undriven touch display module 130. At this time, the touch display device 132 in the electronic apparatus 100 can display an input interface (e.g., a virtual keyboard or a virtual keypad) in the virtual input area, so that the user can perform touch input operations, for example, through the input interface. Moreover, a plurality of functional key icons (e.g., the ESC, ENTER, UP(↑), DOWN (↓), LEFT(←), RIGHT(→) keys in the keyboard) may be included in the input interface, wherein each of the functional-key icons can correspond to different function signals and scan codes.

When the virtual input area of the touch display device 132 is touched, the touch display device 132 can accordingly generate a touch event. So the touch input controller 134 can receive the touch event and translate the touch event into a corresponding coordinate of the touch display device 132. Next, the touch input controller 134 determines if the coordinate is in a display area of any of the functional-key icons through, for example, a coordinate determination function. When the touch input controller 134 determines that the coordinate of the touch event is in the display area of a specific functional-key icon, a corresponding function signal FS (such as a digital hardware signal 0101) of the functional-key icon is then generated according to the determination. Next, the touch input controller 134 transmits the function signal FS (such as a digital hardware signal 0101) to the embedded controller 140 through the hardware interface 150 such as a GPIO. After receiving the function signal FS, the embedded controller 140 can translate the function signal FS into a scan code SC and transmit the scan code SC to the processor 110 to execute a functional-key function corresponding to the scan code SC. The scan code SC is, for example, a virtual key-code.

In some embodiments, the touch input controller 134 can store the function signal FS in a buffer (not shown), and the embedded controller 140 can retrieve the function signal FS from the buffer through, for example, an interrupt signal sent from a platform development driver (PDD), and then the function signal FS may be translated into a scan code of a virtual key code via a model device driver (MDD), but the embodiments of the invention are not limited thereto.

In one embodiment, after the electronic apparatus 100 has been initialized, the operating system can be loaded, and the touch display module 132 can be defined as the touch screen through the driver program loaded by the operating system.

In another aspect, when a user touches a location not in an area of an input interface (such as a virtual keyboard), since the touch input controller 134 cannot generate a corresponding function signal FS according to a coordinate of the current touch event, the touch input controller 134 can transmit the coordinate to the embedded controller 140 through the hardware interface 150. Or, in other embodiments, the touch input controller 134 can also transmit the coordinate to the processor 110 through other interfaces (such as a universal serial bus (USB)). Then, the processor 110 can determine whether to execute a corresponding operation according to the transmitted coordinate.

Accordingly, during the stage where the electronic apparatus 100 has executed the initialization program and not initialized the operating system, the user can still input operations into the electronic apparatus 100 through the input interface provided by the touch display device 132. Therefore, the user's operations are not limited by the functions provided by the originally available physical keyboard of the electronic apparatus 100.

Figure 2A:
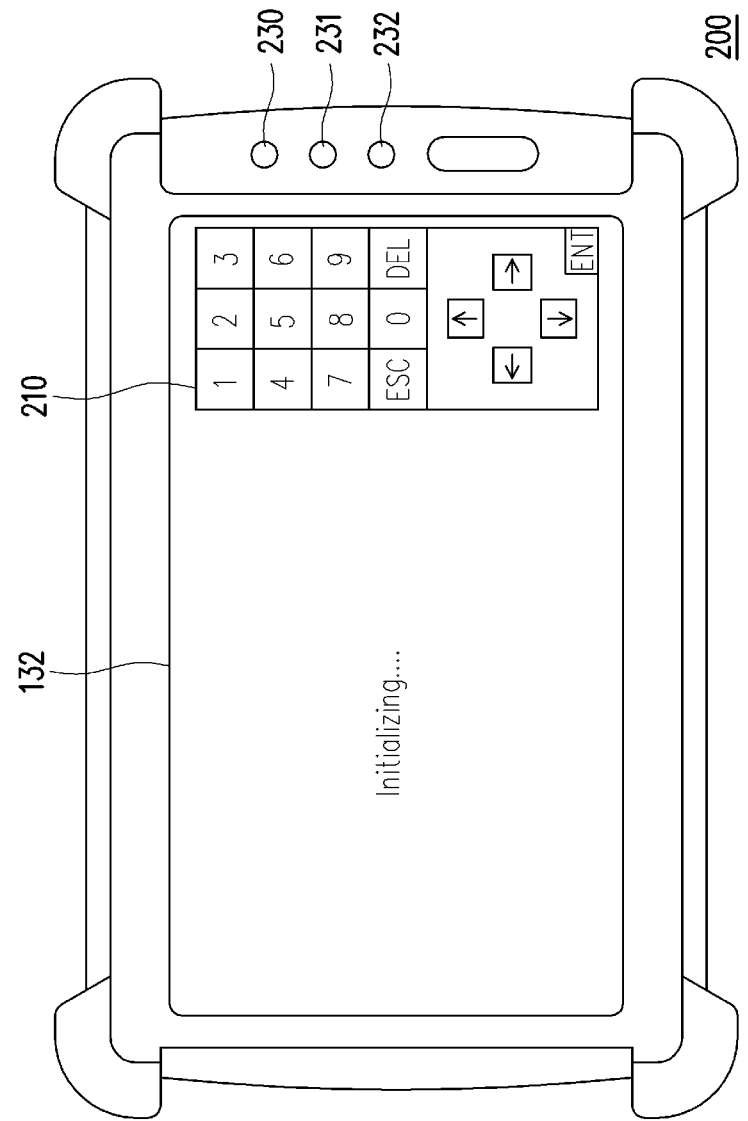
FIG. 2A is a schematic view of an input interface displayed on an electronic apparatus according to an embodiment of the invention.

FIG. 2A is a schematic view of an input interface displayed on an electronic apparatus according to an embodiment of the invention. In the present embodiment, the electronic apparatus 200 may include the physical keys 230-232 and the input interface is implemented by a virtual numeric keyboard 210, for instance. The virtual numeric keyboard 210 may be displayed on the right side of the touch display device 132 for user's convenience. Therefore, when the electronic apparatus 200 is being initialized, the user can control objects such as a menu through the ESC, UP(↑), DOWN(↓), LEFT(←), RIGHT(→) keys in the virtual numeric keyboard 210.

Figure 2B:
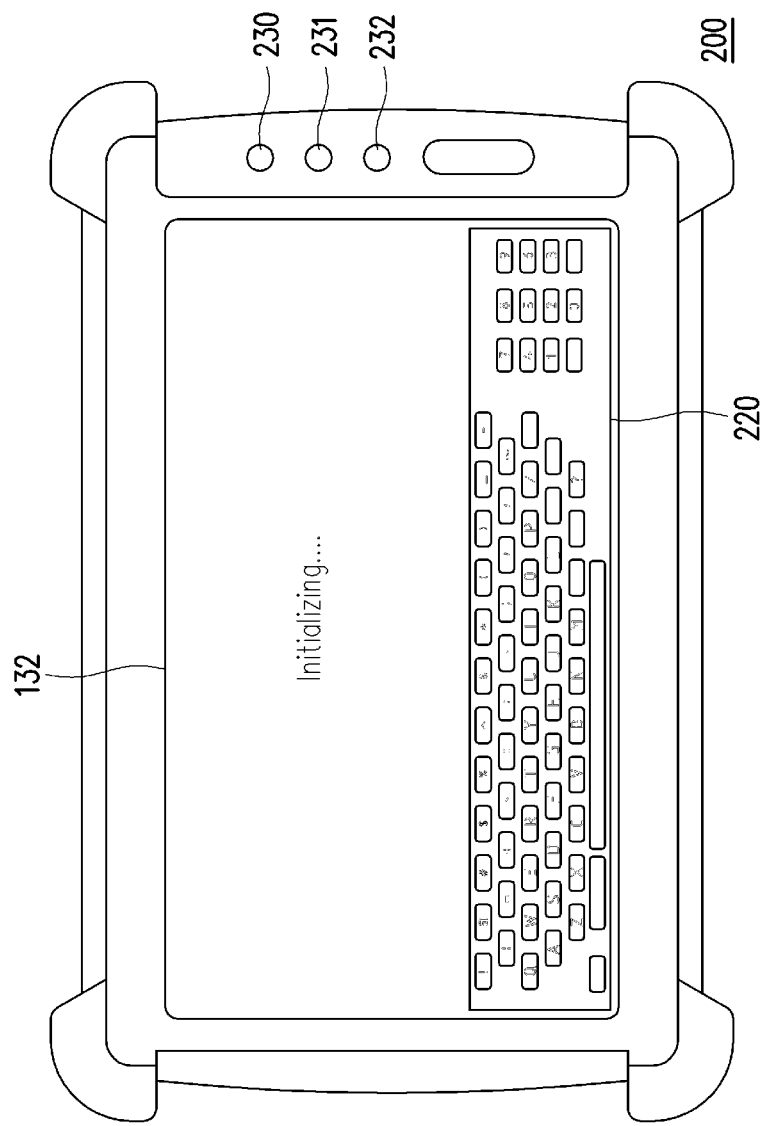
FIG. 2B is a schematic view of an input interface displayed on an electronic apparatus according to another embodiment of the invention.

FIG. 2B is a schematic view of an input interface displayed on an electronic apparatus according to another embodiment of the invention. In the present embodiment, the input interface may be implemented by a virtual keyboard 220. The virtual keyboard 220 may be displayed at the lower part of the touch display device 132 for user's convenience. Therefore, when the electronic apparatus 200 is being initialized, the user may also input through the virtual keys in the virtual keyboard 220.

As well known by people skilled in the art, the displayed location of the aforementioned input interface (e.g., the virtual numeric keyboard 210 and the virtual keyboard 220) on the touch display device 132 and the placement of the functional key icons may be adjusted according to the requirements of different designs, and embodiments of the invention are not limited thereto.

Figure 3:
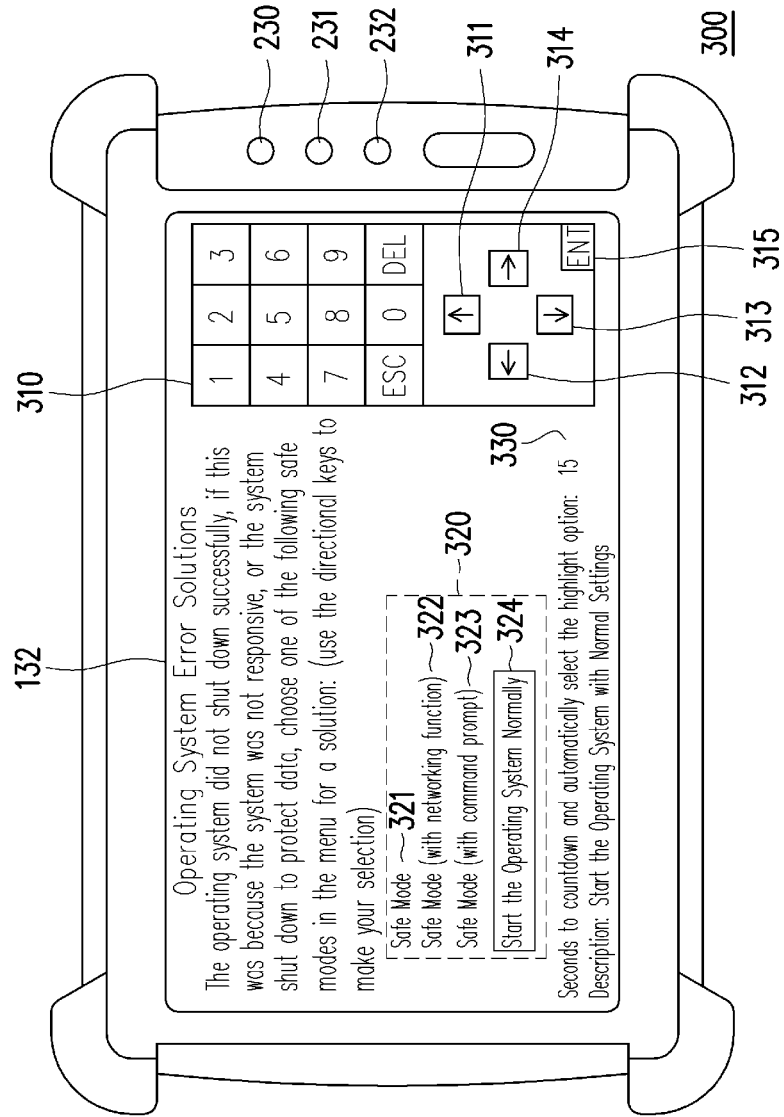
FIG. 3 is a schematic view of inputting with an input interface during an initialization stage according to an embodiment of the invention.

FIG. 3 is a schematic view of inputting with an input interface during an initialization stage according to an embodiment of the invention. In the present embodiment, when an abnormal shutdown occurs during a previous operation of the electronic apparatus 300, a displayed screen in FIG. 3 may be shown the during the initialization stage of the next boot up. Accordingly, the user can voluntarily select whether to load the operating system in a safe mode, for example. In FIG. 3, the displayed screen of the touch display device 132 includes a menu 320 which includes a plurality of options 321-324. When the situation as shown as FIG. 3 occurs, the user can select an option through the directional keys 311-314 in a virtual numeric keyboard 310, and the user can execute the operation corresponding to the selected option by the ENT key 315 (enter key). Therefore, the user can execute the operation corresponding to the selected option before a countdown of a leftover time 330 (e.g. 15 seconds) is completed. So the convenience of the user operation can be enhanced and operating time is saved.

Figure 4:
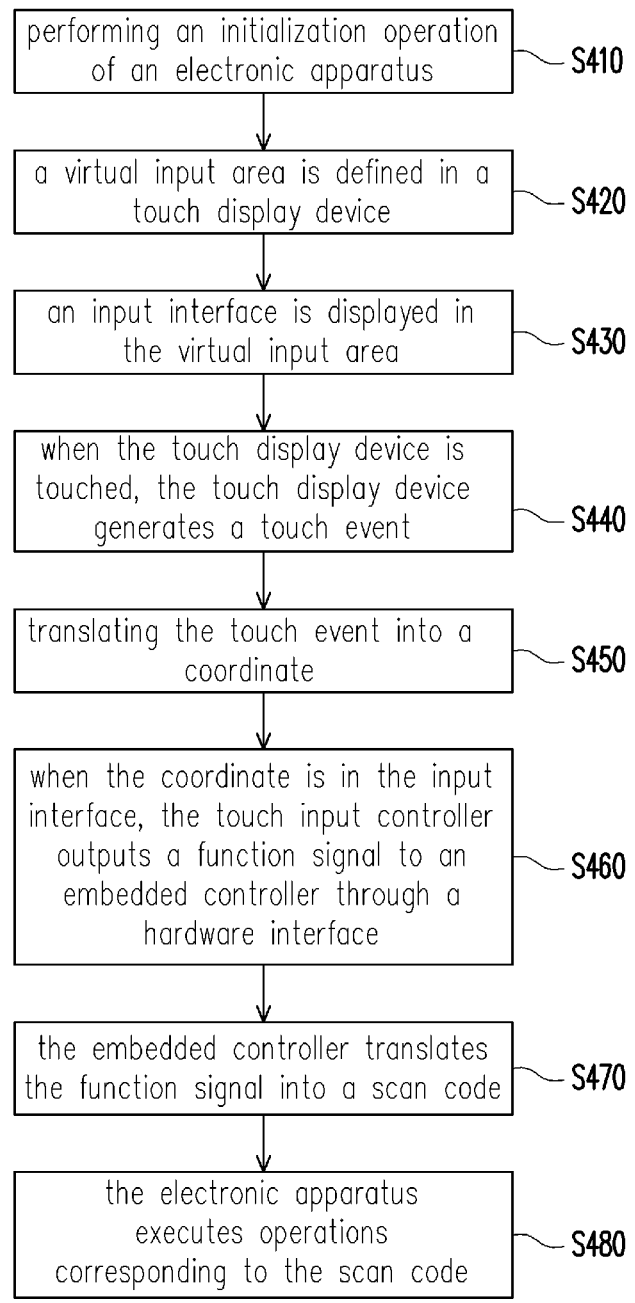
FIG. 4 is a flow chart of a touch display method according to an embodiment of the invention.

FIG. 4 is a flow diagram of a touch display method according to an embodiment of the invention, in which the touch display method may be executed by the electronic apparatus in FIG. 1. Referring to both FIG. 1 and FIG. 4, the proposed method for switching the applications in the user interface may be adapted for the electronic apparatus 100, but the invention is not limited thereto. In step S410, the processor 110 loads the BIOS 120 to execute an initialization program to perform an initialization of the electronic apparatus 100. At this time, the electronic apparatus 100 has not loaded an operating system. In step S420, a virtual input area is defined in the touch display device 132. Moreover, in step S430, an input interface is displayed in the virtual input area. In step S440, when the touch display area 132 is touched, the touch display device 132 accordingly generates a touch event. In addition, in step S450, the touch input controller 134 translates the touch event into a coordinate. In step S460, when the touch input controller 134 determines that the coordinate is in the input interface, the touch input controller 134 outputs a function signal FS to the embedded controller 140 through the hardware interface 150. In step S470, the embedded controller 140 translates the function signal FS into the scan code SC, and in step S480, the scan code SC is transmitted to the processor 110 for the electronic apparatus 100 to execute operations corresponding to the scan code SC.

In view of the foregoing, by using the electronic apparatus and the touch display method thereof provided in the embodiments of the invention, the user can still operate on the objects in the menu, for example, through the input interface displayed by the touch display device during the initialization stage of the electronic apparatus. Accordingly, even when the physical buttons on the electronic apparatus have insufficient functions, the user can still input commands into the electronic apparatus through the virtual input interface during the system initialization. Therefore, the operational efficiency and flexibility of the electronic apparatus can be enhanced.

Although the invention has been described with reference to the above embodiments, it is not intended to limit the invention. It will be apparent to people of ordinary skill in the art that modifications and variations to the described embodiments may be made without departing from the spirit and scope of the invention. Accordingly, the scope of the invention will be defined by the attached claims, not by the above detailed descriptions.

What is claimed is:

1. An electronic apparatus, comprising:
   a processor executing an operating system and loading a basic input/output system (BIOS) to execute an initialization program; and
   a touch display module, comprising:
      a touch display device having a virtual input area, wherein the virtual input area displays an input interface, the touch display device generating a touch event when the touch display device is touched; and a touch input controller coupled to the touch display device, the touch input controller receiving the touch event and translating the touch event into a coordinate; and an embedded controller (EC) coupled to the touch input controller through a hardware interface, wherein, when the electronic apparatus has loaded the initialization program and the electronic apparatus has not loaded the operating system, the virtual input area displays an input interface comprising a virtual keyboard comprising a plurality of functional key icons, wherein, when the electronic apparatus has loaded the initialization program and the electronic apparatus has not loaded the operating system, and the coordinate is in the input interface corresponding to one of the functional key icons, the touch input controller outputs a corresponding function signal to the embedded controller through the hardware interface, the embedded controller translates the corresponding function signal into a corresponding scan code, and the electronic apparatus executes operations corresponding to the scan code, and wherein when the coordinate is not in the input interface, the touch input controller transmits the coordinate to the processor.

2. The electronic apparatus of claim 1, wherein after the electronic apparatus loads the operating system, the touch display module is defined as a touch screen.

3. The electronic apparatus of claim 1, wherein the electronic apparatus loads the initialization program to perform an initialization;

wherein, after the electronic apparatus completes the initialization, the processor executes and loads the operating system.

4. The electronic apparatus of claim 1, wherein the functional key icons comprise navigation keys and an enter key.

5. The electronic apparatus of claim 4, wherein when the coordinate is in a touched functional key icon of the plurality of functional key icons, the touch input controller outputs the corresponding function signal of the touched functional-key icon to the embedded controller.

6. The electronic apparatus of claim 4, wherein when the coordinate is in a touched functional key icon of the plurality of functional key icons, the embedded controller translates the corresponding function signal of the touched functional-key icon into the corresponding scan code and transmits the corresponding scan code to the processor.

7. The electronic apparatus of claim 1, wherein the hardware interface is a general purpose input/output (GPIO) interface.

8. The electronic apparatus of claim 1, wherein the processor executes a functional-key function according to the scan code.

9. The electronic apparatus of claim 1, wherein the functional key icons comprise a plurality of alpha-numeric keys.

10. A touch display method, adapted for an electronic apparatus, wherein the electronic apparatus comprises a touch display module and an embedded controller, and the touch display module comprises a touch display device and a touch input controller coupled to the embedded controller through a hardware interface, the touch display method comprising:

loading a basic input/output system (BIOS) to perform an initialization operation of the electronic apparatus, when the electronic apparatus has not loaded an operating system;

defining a virtual input area in the touch display device;

displaying an input interface comprising a virtual keyboard comprising a plurality of functional key icons on the virtual input area;

generating a touch event when the touch display device is touched;

translating the touch event into a coordinate by the touch input controller;

when the coordinate value is in the input interface corresponding to one of the functional key icons, outputting a corresponding function signal to the embedded controller through the hardware interface by the touch input controller;

translating the corresponding function signal into a corresponding scan code by the embedded controller; and executing operations corresponding to the scan code by the electronic apparatus, wherein when the coordinate is not in the input interface, outputting the coordinate, the touch input controller outputs the coordinate to the electronic apparatus.

11. The touch display method of claim 10, further comprising:

loading the operating system of the electronic apparatus; and defining the touch display module as a touch screen.

12. The touch display method of claim 10, wherein performing the initialization operation of the electronic apparatus comprises:

controlling the electronic apparatus to load an initialization program to perform the initialization operation.

13. The touch display method of claim 10, wherein the functional key icons comprise navigation keys and an enter key.

14. The touch display method of claim 13, wherein when the coordinate is in a touched functional key icon of the plurality of functional key icons, the touch input controller outputs the corresponding function signal of the touched functional-key icon to the embedded controller.

15. The touch display method of claim 13, when the coordinate is in a touched functional key icon of the plurality of functional key icons, the embedded controller translates the corresponding function signal of the touched functional-key icon into the corresponding scan code and transmits the corresponding scan code to the processor.

16. The touch display method of claim 10, wherein the hardware interface is a general purpose input/output (GPIO) interface.

17. The touch display method of claim 10, wherein the step of executing the operations according to the scan code comprises:

executing a functional-key function according to the scan code.

18. The touch display method of claim 10, wherein the functional key icons comprise a plurality of alpha-numeric keys.

* * * * *